US012615538B2

(12) United States Patent
Hafeez et al.

(10) Patent No.: US 12,615,538 B2
(45) Date of Patent: Apr. 28, 2026

(54) SYSTEMS AND METHODS FOR DETECTING CELL POSITIONING ANOMALIES

(71) Applicant: NetScout Systems, Inc., Westford, MA (US)

(72) Inventors: Imran Hafeez, Allen, TX (US); Wing F. Lo, Plano, TX (US); Jonathan Zingman, Oakland, CA (US)

(73) Assignee: NetScout Systems, Inc., Westford, MA (US)

( * ) Notice: Subject to any disclaimer, the term of this patent is extended or adjusted under 35 U.S.C. 154(b) by 653 days.

(21) Appl. No.: 18/188,190

(22) Filed: Mar. 22, 2023

(65) Prior Publication Data

US 2024/0284236 A1     Aug. 22, 2024

Related U.S. Application Data

(60) Provisional application No. 63/447,133, filed on Feb. 21, 2023.

(51) Int. Cl.
| | |
|---|---|
| *H04W 28/02* | (2009.01) |
| *H04L 5/00* | (2006.01) |
| *H04W 24/10* | (2009.01) |

(52) U.S. Cl.
CPC ....... *H04W 28/0226* (2013.01); *H04L 5/0048* (2013.01); *H04W 24/10* (2013.01)

(58) Field of Classification Search
CPC . H04W 28/0226; H04W 64/00; H04W 24/10; H04W 24/02; H04L 5/0048
See application file for complete search history.

(56) References Cited

U.S. PATENT DOCUMENTS

| | | | |
|---|---|---|---|
| 2018/0115913 A1* | 4/2018 | Menon ................. | H04W 16/28 |
| 2024/0230828 A9* | 7/2024 | Hirzallah ............ | G01S 5/02525 |
| 2024/0406909 A1* | 12/2024 | Shreevastav .......... | G01S 5/0036 |
| 2025/0016596 A1* | 1/2025 | Chen .................... | H04B 7/0639 |
| 2025/0365593 A1* | 11/2025 | Jia ........................ | G06N 3/0895 |

* cited by examiner

*Primary Examiner* — Oussama Roudani
(74) *Attorney, Agent, or Firm* — Foley & Lardner LLP

(57) ABSTRACT

A method for detecting cell positioning anomalies is disclosed. Control plane signaling data packets are collected associated with multiple cells of a communications network. Distance and azimuth values for individual communication sessions are calculated for each cell. A machine learning model is executed using various communication parameters as input to generate a classification for each cell. A list identifying which cells are experiencing anomalies is generated.

23 Claims, 7 Drawing Sheets

400

SYSTEMS AND METHODS FOR DETECTING CELL POSITIONING ANOMALIES

CROSS-REFERENCE TO RELATED APPLICATION

This application claims the benefit of priority to U.S. Provisional Application No. 63/447,133, filed Feb. 21, 2023, the entirety of which is incorporated by reference herein.

BACKGROUND

Cellular Service Providers (CSPs) deploy multiple (e.g., to the order of tens of thousands) radio antennas to provide adequate cellular coverage in multiple wireless communications systems. A tower may have (e.g., three) antennas providing coverage in different angular directions. CSPs may document the area of antenna coverage via various configuration parameters, such as azimuth and horizontal and vertical beam width. These configuration parameters are important for system planning configuration, capacity, and monitoring calls (e.g., crucial for 911 services).

However, the configuration parameters (as reported by the CSPs) may be incorrect (e.g., include errors). For example, when installing the antennas or making updates to the antennas en masse, mistakes in installation or updates (e.g., human error) may occur. Other errors may also occur due to environmental factors, such as high winds, that may shift the angle of the antennas, which may result in drift in the accuracy of the geo-spatial parameters.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
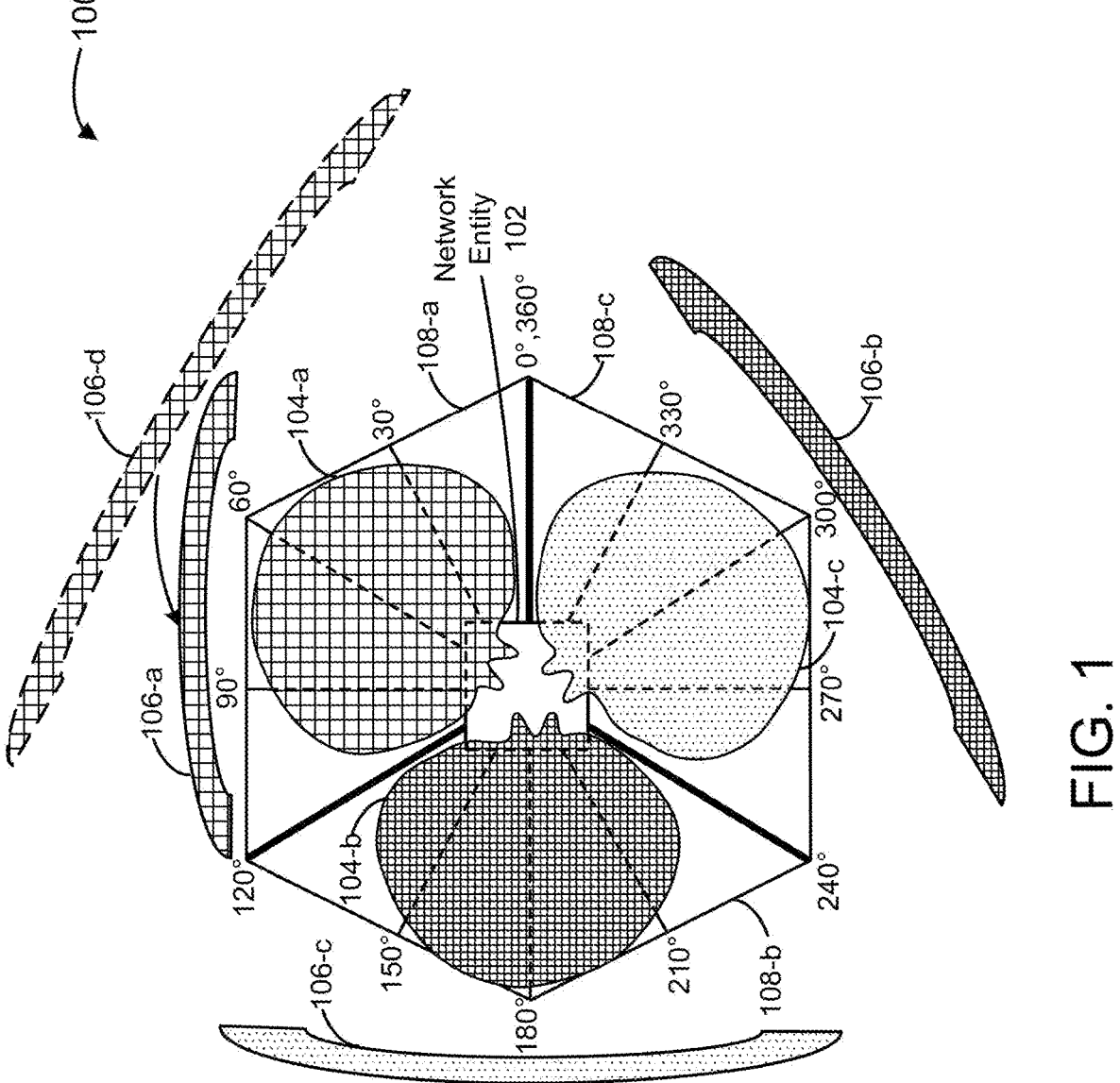
FIG. 1 is an illustration of a wireless communication system that supports detecting cell positioning anomalies, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

In a wireless communications system, some configuration parameters (as reported by a Cellular Service Provider (CSP)) may be incorrect. For example, a tower included in the wireless communications system may include various antennas. The antennas may provide cellular coverage to physical (e.g., geographic) areas (e.g., cells). CSPs may document various configuration parameters (e.g., geo-spatial positioning, azimuth, beam widths) associated with each cell, which may provide data for system planning (e.g., planning where to place each antenna in a grid), configuration, capacity (e.g., how many wireless devices may be supported within a cell), and monitoring communications (e.g., calls), among other examples. However, due to human error and/or natural causes (e.g., trees, wind, etc.), the documentation of the various configuration parameters may be incorrect from (e.g., different than) the actual azimuth and beam widths in deployment and/or a nominal azimuth (e.g., a center of a boresight, a center of a majority of signal strength). This may result in higher latency, decreased coverage, increased rate of dropped calls, inefficient system planning, or any combination thereof, among other issues. CSPs and other entities may have difficulties detecting these errors (e.g., cell anomalies). For example, they may not have the ability to detect the anomalies, may detect the anomalies only after they are notified from end users (e.g., customers), may detect the anomalies only after manually checking the towers and antennas of each cell, and/or may detect the anomalies within a limited area of coverage, among other problems.

A computer implementing the systems and methods described herein may provide for detecting anomalies associated with the configuration parameters (e.g., communication parameters, cell positioning), overcoming the aforementioned deficiencies. For example, the computer may operate to execute a machine learning model, using various communication parameters as input, to detect anomalies. The computer may do so by operating to calculate distance values and azimuth values for individual communication sessions of each cell to input to the machine learning model. For example, each cell can support multiple clients (e.g., user equipment) and each client can set up multiple calls (or communication sessions (e.g., radio resource control (RRC) connections)) with a cell. Each time a client is engaged with a cell in a communication session, one distance value (e.g., a distance between a cell and a user equipment of a communication session) and one azimuth value (e.g., an azimuth value for an antenna of the cell during the communication session) can be generated for the communication session. In some cases, the computer may operate to generate a list of classifications per cell of a communications network indicating whether each cell is experiencing an anomaly based on output from the machine learning model.

To calculate the distance values and the azimuth values for individual communication sessions of each cell, the computer may collect various control plane signaling data packets. For example, the computer may collect minimization of drive test (MDT) data associated with devices connected to a network. The MDT data may include global positioning system (GPS) location information, accuracy information, and communication timing information, among other information, for each device per call per cell. For example, the device may be connected to a single cell and communicate with the cell. For each communication between the cell and the device, the computer may collect control plane data (e.g., MDT data). The computer may operate to filter the MDT data and derive (e.g., calculate) the distance value and the azimuth value based on the filtered MDT data and other configuration parameters from the network. In some implementations, the computer may operate to filter the data after calculating the distance and azimuth values. The computer may filter the data prior to inputting the data into a machine learning model to increase the accuracy of the outputs by the machine learning model.

To generate the list, the computer may execute the machine learning model using the filtered MDT data, the distance value, the azimuth value, the other configuration parameters, or any combination thereof, as input. Based on the outputs of the machine learning model, the computer may operate to determine whether a cell is experiencing an anomaly (e.g., a classification model output). Responsive to determining a classification for each cell, the computer may operate to generate a list of the classifications and transmit, to a server, an indication of anomalous cells.

The techniques described herein may result in various advantages over the aforementioned technical deficiencies. For example, adopting the machine learning classification process described herein for detecting anomalies in cells (e.g., automatic cell anomaly detection) may allow for a higher rate of anomaly detection in a shorter amount of time, actionable intelligence to correct both the documentation of various configuration parameters and the anomalous cells, and improved alerting capabilities and network planning, among other advantages.

FIG. 1 illustrates a wireless communication system 100 that supports detecting cell positioning anomalies, in accordance with an implementation. The wireless communication system 100 may include a network entity 102 (e.g., a tower) that includes various antennas at different positions along the tower. One or more of the antennas (e.g., transmit/receive antenna modules) may provide wireless coverage for a geographical area. In some cases, a cell 108 (e.g., a serving cell) may refer to both the antennas and the geographical area the antennas provide coverage for. With regard to the example of FIG. 1, the network entity 102 provides coverage, via the various antennas, to a first cell 108-a, a second cell 108-b, and a third cell 108-c. For example, the first cell 108-a may include an area between degrees 0-120 (e.g., an azimuth of 0-120), the second cell 108-b may include an area between degrees 120-240 (e.g., an azimuth of 120-240), and the third cell 108-c may include an area between degrees 240-360 (e.g., an azimuth of 240-0). While FIG. 1 illustrates a wireless communication system 100 with three cells 108 for a network entity 102, it is to be understood that any configuration of quantities of cells to quantities of network entities may be supported by the techniques described herein.

Each cell 108 may include a center of signal strength (e.g., a nominal boresight) that may include a horizontal beam width (HBW) of 60 degrees (e.g., a section of a main lobe where the antenna signal or gain drops by three dB from the boresight). For instance, a center 104-a of the first cell 108-a may include an area from 30 degrees to 90 degrees. The center 104-a may indicate an area where the strength (e.g., quality, power, etc.) of signaling between a user equipment (UE) (e.g., a wireless device) and the network entity 102 is highest. Areas outside of the center 104-a within the first cell 108-a (e.g., the area between 0 degrees and 30 degrees and the area between 90 degrees and 120 degrees) may be considered areas of lower signal strength (e.g., sections of the main lobe that experience lower signal strength). The second cell 108-b and the third cell 108-c may include respective centers 104-b and 104-c. In the example of FIG. 1, each coverage area 106 may indicate an area of measured coverage (e.g., MDT data, an area of 120 degrees).

In some implementations, the network entity 102 may determine (e.g., receive, calculate, etc.) various configuration parameters associated with each cell 108. For example, the network entity 102 (or another probe 204 of the wireless communication system, as described herein with reference to FIG. 2) may collect control plane signaling data packets that include data for the configuration parameters (e.g., indicating values of the configuration parameters). In some examples, the data may include azimuth and distance values (e.g., derived values) for each cell 108. In some implementations, CSPs may report associated configuration parameters via a network element table. The configuration parameters collected by the network entity 102 may be field parameters (e.g., parameters collected in deployment) and the configuration parameters indicated by the network element table may be preconfigured parameters (e.g., parameters indicated during installation).

In some cases, the cells 108 may experience anomalies. In a first example, the first cell 108-a may be experiencing a first type of anomaly (e.g., cell drift). The coverage area 106-d may indicate an area of coverage associated with configuration parameters (e.g., geo-spatial parameters) indicated by the network element table. Due to various potential events (e.g., strong winds, earthquakes, storms, etc. over time) the measured configuration parameters (e.g., the field parameters) may be associated with the coverage area 106-a, shifted by 30 degrees to the left of the coverage area 106-d. Thus, the first cell 108-a has drifted to service UEs with a highest signal strength between 60 and 120 degrees, rather than between 90 and 30 degrees. In some examples, the first cell 108-a may not be experiencing an anomaly if the measured configuration parameters are associated with the coverage area 106-d.

In a second example, the second cell 108-b and the third cell 108-c may be experiencing a second type of anomaly (e.g., crossed feeder) due to incorrect configuration data or human error. For instance, during installation, cabling (e.g., wires) for the antennas associated with the second cell 108-b and the third cell 108-c may be crossed (e.g., switched). This may cause the coverage area 106-b, associated with the second cell 108-b (e.g., labeled as being for the second cell 108-b), to indicate an area of coverage between degrees 270 and 330 (e.g., the center 104-c of the third cell 108-c), while the coverage area 106-c, associated with the third cell 108-c, may indicate an area of coverage between degrees 150 and 210 (e.g., the center 104-b of the second cell 108-b). Thus, MDT data for the second cell 108-b may be labeled as for the third cell 108-c and MDT data for the third cell 108-c may be labeled as for the second cell 108-b.

These cell anomalies may result in various technical difficulties. For example, locations for each cell may be planned to form a grid of wireless coverage that may support a number of wireless devices. If cells are experiencing anomalies, wireless devices may experience an increased rate of dropped calls, decreased coverage, higher latency, and more. The techniques described herein may provide methods and systems for detecting cell positioning anomalies by causing a computer to calculate distance and azimuth values for each cell, execute a machine learning model, and generate a list of classifications for each cell indicating whether the cell is experiencing an anomaly based on the output of the machine learning model.

While the illustration of FIG. 1 depicts examples of two types of anomalies (e.g., crossed feeder anomaly and cell drift anomaly) multiple other types of anomalies may exist. The techniques described herein may support detecting multiple other types of anomalies in addition to those illustrated as examples.

Figure 2:
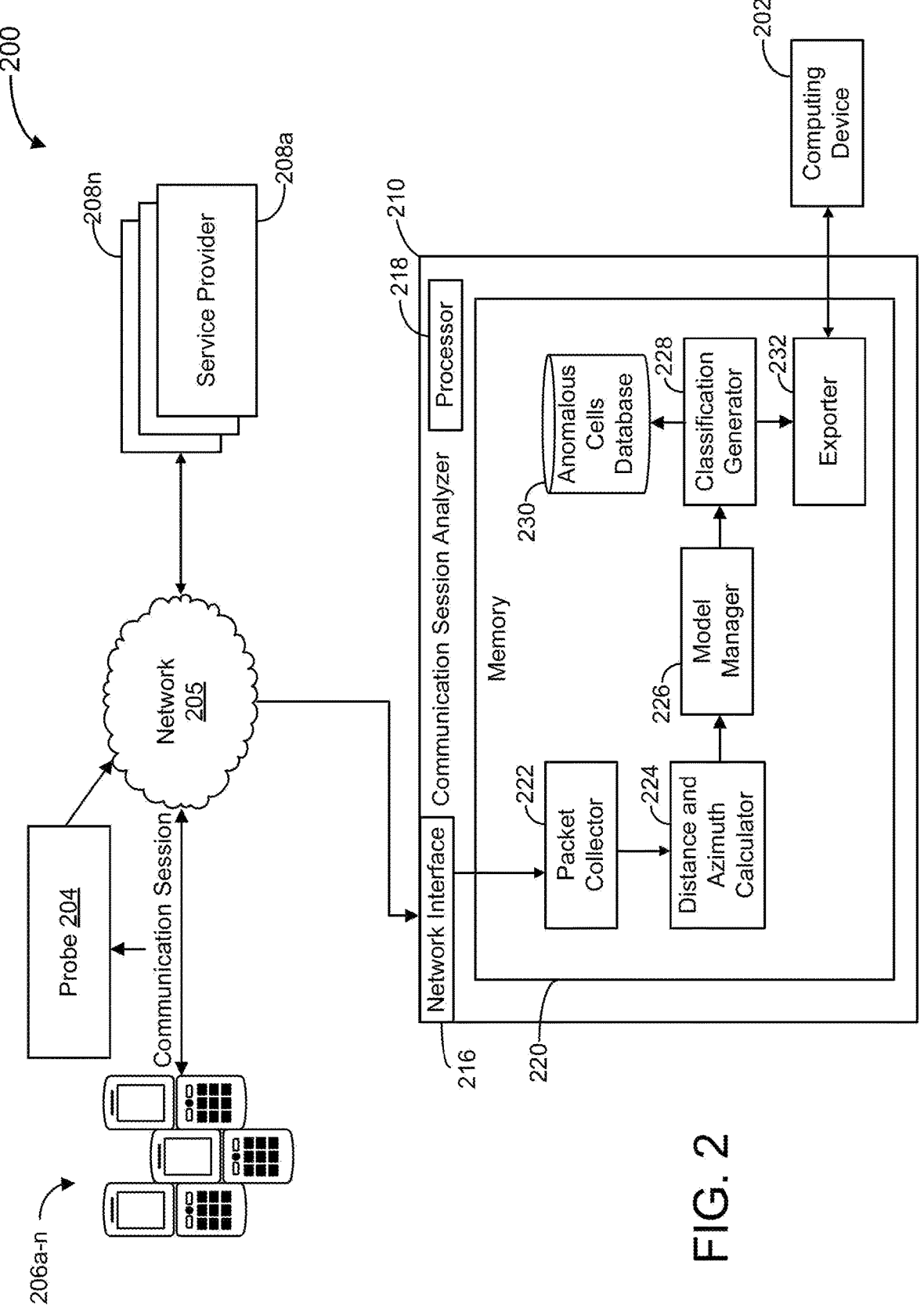
FIG. 2 is an illustration of a system that supports detecting cell positioning anomalies, in accordance with an implementation.

FIG. 2 illustrates an example system 200 for detecting cell positioning anomalies, in accordance with an implementation. The system 200 may provide improved anomaly detection for cell positioning in a wireless communication system. In brief overview, the system 200 may include a probe 204 that receives and/or stores data packets transmitted via a network 205 between client devices 206a-n (hereinafter client device 206 or client devices 206) and service providers 208a-n (hereinafter service provider 208 or service providers 208). The service providers 208 can each include a set of one or more servers 502, depicted in FIG. 5A, or a data center 508. The elements of the system 200 can be the same as or similar to corresponding elements in FIGS. 5A-5C. System 200 can also include a communication session analyzer 210 that can communicate or interface with the probe 204 and/or a computing device 202, either directly or via the network 205, to collect data packets (e.g., control plane signaling) regarding communication sessions between client devices 206 and service providers 208. Communication session analyzer 210 can collect data from the probe 204 and generate, via a machine learning model, a list identifying classifications indicating whether different cells are experiencing an anomaly. Communication session analyzer 210 can communicate the generated list to the computing device 202 and/or the service providers 208.

The probe 204, the client devices 206, the service providers 208, the computing device 202, and/or the communication session analyzer 210 can include or execute on one or more processors or computing devices (e.g., the computing device 503 depicted in FIG. 5C) and/or communicate via the network 205. The network 205 can include computer networks such as the Internet, local, wide, metro, or other area networks, intranets, satellite networks, and other communication networks such as voice or data mobile telephone networks. The network 205 can be used to access information resources such as web pages, web sites, domain names, or uniform resource locators that can be presented, output, rendered, or displayed on at least one computing device (e.g., client device 206), such as a laptop, desktop, tablet, personal digital assistant, smart phone, portable computers, or speaker. For example, via the network 205, the client devices 206 can stream videos in video sessions provided by service providers 208 or otherwise communicate with the servers of the service providers 208 for data. In some embodiments, network 205 may be or include a self-organizing network that implements a machine learning model to automatically adjust connections and configurations of network elements of network 205 to optimize network connections (e.g., minimize latency, reduce dropped calls, increase data rate, increase quality of service, etc.).

Each of the probe 204, the client devices 206, the service providers 208, the computing device 202, and/or the communication session analyzer 210 can include or utilize at least one processing unit or other logic device such as programmable logic array engine, or module configured to communicate with one another or other resources or databases. The components of the probe 204, the client devices 206, the service providers 208, the computing device 202, and/or the communication session analyzer 210 can be separate components or a single component. System 200 and its components can include hardware elements, such as one or more processors, logic devices, or circuits.

Still referring to FIG. 2, and in further detail, system 200 can include the service providers 208. The service providers 208 may each be or include servers or computers configured to transmit or provide services across network 205 to client devices 206. The service providers 208 may transmit or provide such services upon receiving requests for the services from any of the client devices 206. The term "service" as used herein includes the supplying or providing of information over a network, and is also referred to as a communications network service. Examples of services include 5G broadband services, any voice, data or video service provided over a network, smart-grid network, digital telephone service, cellular service, Internet protocol television (IPTV), etc.

Client devices 206 can include or execute applications to receive data from the service providers 208. For example, a client device 206 may execute a video application upon receiving a user input selection that causes the client device 206 to open the video application on the display. Responsive to executing the video application, a service provider 208 associated with the video application may stream a requested video to the client device 206 in a communication session. In another example, a client device 206 may execute a video game application. Responsive to executing the video game application, a service provider 208 associated with the video game application may provide data for the video game application to the client device 206. The client devices 206 may establish communication sessions with the service providers 208 for any type of application or for any type of call. In some cases, each client device 206 may establish multiple communication sessions (e.g., radio resource control (RRC) connections) with one or more of the service providers 208. Various parameters (e.g., distance values, azimuth values, etc.) may be associated with each communication session.

A client device 206 can be located or deployed at any geographic location in the network environment depicted in FIG. 2. A client device 206 can be deployed, for example, at a geographic location where a typical user using the client device 206 would seek to connect to a network (e.g., access a browser or another application that requires communication across a network). For example, a user can use a client device 206 to access the Internet at home, as a passenger in a car, while riding a bus, in the park, at work, while eating at a restaurant, or in any other environment. The client device 206 can be deployed at a separate site, such as an availability zone managed by a public cloud provider (e.g., a cloud 510 depicted in FIG. 5B). If the client device 206 is deployed in a cloud 510, the client device 206 can include or be referred to as a virtual client device or virtual machine. In the event the client device 206 is deployed in a cloud 510, the packets exchanged between the client device 206 and the service providers 208 can still be retrieved by probe 204 from the network 205. The computing device 202 may be similar to client devices 206. In some cases, the probe 204, the client devices 206, and/or the communication session analyzer 210 can be deployed in the cloud 510 on the same computing host in an infrastructure 516 (described below with respect to FIG. 5B).

As service providers 208 provide or transmit data in communication sessions to client devices 206, the probe 204 may intercept or otherwise monitor the control plane signaling data (e.g., control plane signaling data packets) of the communication sessions. The probe 204 may comprise one or more processors that are connected to a network equipment manufacture (NEM) trace port of network 205. In some embodiments, the probe 204 may collect control plane signaling data at an Evolved Packet Core interface (e.g., the S1-MME interface or the S6a interface) of the network 205. The control plane signaling data may include geographical location data (e.g., global positioning system data) of the client devices 206 as client devices 206 receive data and/or transmit, a cell identifier identifying the cell in which the respective client device 206 was served while transmitting or receiving the data, a device identifier (e.g., IMSI, MAC address, IP address, etc.) of the client device 206, dropped calls (e.g., disconnects from the streaming video provider), MAC PHY bandwidth, number of resource connection procedures a second, reference signals received power (RSRP), reference signal received quality (RSRQ), signal to interference and noise ratio (SINR), handover information, timestamps indicating when the data was collected or generated, etc. The probe 204 may receive such data and forward the data to the communication session analyzer 210 over the network 205 for further processing.

Communication session analyzer 210 may comprise one or more processors that are configured to collect control plane data packets, execute a machine learning model using cell parameters as input to determine whether any cell is experiencing an anomaly, and generate a list indicating the anomalous and non-anomalous cells. The communication session analyzer 210 may comprise a network interface 216, a processor 218, and/or memory 220. Communication session analyzer 210 may communicate with any of the computing device 202, the probe 204, the client devices 206, and/or the service providers 208 via the network interface 216. The processor 218 may be or include an ASIC, one or more FPGAs, a DSP, circuits containing one or more processing components, circuitry for supporting a microprocessor, a group of processing components, or other suitable electronic processing components. In some embodiments, the processor 218 may execute computer code or modules (e.g., executable code, object code, source code, script code, machine code, etc.) stored in the memory 220 to facilitate the operations described herein. The memory 220 may be any volatile or non-volatile computer-readable storage medium capable of storing data or computer code.

Memory 220 may include a packet collector 222, a distance and azimuth calculator 224, a model manager 226, a classification generator 228, an anomalous cells database 230, and an exporter 232, in some embodiments. In brief overview, the components 222-232 may detect cell positioning anomalies using a machine learning model. To do so the components 222-232 may calculate distance and azimuth values and filter the values (as well as other data) to generate inputs for the machine learning model. The components 222-232 may execute the machine learning model using the generated inputs to determine a classification for each cell. The components 222-232 may use the classifications to generate one or more lists of classifications for each cell (e.g., a list that indicates anomalous and non-anomalous cells). The list can be used by network providers to identify cells that are not functioning properly to perform maintenance on the malfunctioning cells. In some examples, the components 222-232 may generate a list of classifications for each service provider 208 that includes cells associated with the respective service provider 208. In some cases, the components 222-232 may communicate a list to the computing device 202, a service provider 208 associated with one or more cells on the list, or both.

The packet collector 222 may comprise programmable instructions that, upon execution, cause the processor 218 to collect (e.g., obtain, receive) data (e.g., control plane signaling data packets) from the probe 204. The packet collector 222 may collect data by polling or receiving data from the probe 204. The packet collector 222 may poll or receive data from the probe 204 at set intervals or pseudo-randomly. In some examples, the control plane signaling data packets may include various sets of control plane data packets, each associated with various communication sessions. For example, a client device 206a may be communicating with the network 205 via a communication channel (e.g., a communication session). The probe 204 may collect a set of control plane data packets from the communication channel associated with the communication session. The packet collector 222 may poll the probe 204 for the control plane data packets, among other data, and transmit the data to the distance and azimuth calculator 224.

In some implementations, the control plane data packets may include data for communication parameters. The communication parameters may include various parameters per call (e.g., latitude, longitude, end time, reference signal received power (RSRP), reference signal received quality (RSRQ), inter-site distance (ISD), azimuth, HBW) and various parameters per communication session (e.g., latitude, longitude, accuracy, time (e.g., end time or start time of the respective communication sessions)), as described herein with reference to FIG. 3. For example, the set of control plane data packets may include MDT data, where the MDT data may include GPS location data indicating the geolocation of the client device 206a, accuracy data indicating the accuracy of the GPS location data, and/or timing data indicating the time and duration of the communication session, among other data.

The packet collector 222 may store control plane data packets and/or content of the control plane data packets in memory (e.g., the memory 220). The packet collector 222 may store such control plane data packets from multiple communication sessions between different nodes. In some cases, the control plane data packets may be for (e.g., associated with, indicate) communication parameters for each cell of the system 200 (e.g., a communications network). Each set of control plane data packets may be associated with a single communication session between a client device 206 (e.g., a node) and a cell (e.g., of the network 205).

The distance and azimuth calculator 224 may comprise programmable instructions that, upon execution, cause the processor 218 to calculate a distance value and an azimuth value. For example, the processor 218 may use a location of the cell and the GPS location of the client device 206a (with the accuracy of GPS) to calculate the distance and the angle of the client device 206a in relation to the cell. In some examples, the distance value may indicate a distance between a first cell of the network 205 and a first node (e.g., a client device 206) of the system 200. The azimuth value may indicate an angle of a physical location of the first node in relation to the first cell. For example, the client device 206a may have an azimuth value of 100 degrees, with respect to FIG. 1, thus being serviced outside of the center 104-a of the first cell 108-a. Thus, the distance and azimuth calculator 224 may calculate that the client device 206a is outside of the center 104-a and within a drifted coverage area 106-a.

In some cases, the distance and azimuth calculator 224 may filter the data received from the packet collector 222. The distance and azimuth calculator 224 can filter the data to calculate the distance and azimuth values. The distance and azimuth calculator 224 can filter the data based on the data (e.g., the accuracy of the data) satisfying one or more thresholds. In some cases, the distance and azimuth calculator 224 may filter the data received, the distance values, and the azimuth values to generate input to a machine learning model based on whether they satisfy one or more thresholds. For example, the probe 204 may collect multiple control plane data packets per communication session. For instance, a communication session may be a video session that may persist over a long duration (e.g., an hour). During the communication session, the probe 204 may collect control plane data packets at set intervals of time (e.g., every minute) or pseudo-randomly. Thus, the distance and azimuth calculator 224 may receive multiple MDT data points (e.g., 60 data points) for a single communication session. Rather than compute distance and azimuth values for each MDT, in some embodiments, the distance and azimuth calculator 224 may filter the data based on an accuracy value of the MDT associated with the accuracy or uncertainty of the longitude and latitude values of the MDT (e.g., most accurate GPS data or accuracy values above a threshold), a timestamp of the MDT (e.g., closest to session end time, within a duration threshold of the session end time), high power signals (e.g., indicating proximity to the boresight, satisfying a power threshold), MDT within an ISD threshold, MDT associated with non-omni cells (e.g., avoiding omni-cells), or any combination thereof, among other filter parameters. For example, the distance and azimuth calculator 224 can filter values indicating the accuracy of data of a communication session in the data packets that include the data for the communication session. The distance and azimuth calculator 224 can determine whether to filter out the data of the data packets based on whether the accuracy values of the data packets exceed a threshold (e.g., a defined threshold). In some embodiments, the distance and azimuth calculator 224 may calculate the distance and azimuth values and then filter the data as well as the distance and azimuth values. In some cases, filtering the data before inputting to the machine learning model may improve one or more characteristics (e.g., a signal to noise ratio (SNR)) associated with the data and the machine learning model output.

In some cases, the distance and azimuth calculator 224 may generate an off boresight (OBS) value. For instance, the distance and azimuth calculator 224 may use an azimuth value to determine how far the angle of arrival is (e.g., from the client device 206*a*) off the boresight (e.g., the center 104-*a* of FIG. 1) of an antenna associated with the first cell (e.g., the first cell 108-*a* of FIG. 1). In some cases, the OBSs of a cell may be associated with a derived estimation of an environment. For example, various measurements (e.g., RSRP) associated with a client device 206 within a mobile environment may be different from various measurements associated with a client device 206 within an indoor, outdoor, or stationary environment. The communication session analyzer 210 may derive the estimation of the environment based on the OBS and the other various measurements. The distance and azimuth calculator 224 may further filter the data based on the derived environment estimation. The distance and azimuth calculator 224 may transmit (e.g., transfer) the distance value, the azimuth value, the OBS value, the data received from the packet collector 222, or any combination thereof, to the model manager 226.

The model manager 226 may comprise programmable instructions that, upon execution, cause the processor 218 to execute, using at least a portion of the data as input, a machine learning model. For example, the model manager 226 may use the distance values, the azimuth values, the OBS values, environment types, and/or various configuration parameters indicated by the data received from the packet collector 222, among other data (e.g., collected and derived data), as input to the machine learning model. The machine learning model may output an indication of whether a cell is anomalous based on the various inputs. In some cases, the model manager 226 may create distributions based on the received values. For example, a distribution of the OBS values may include multiple OBS values associated with respective communication sessions for a first cell. The distribution may include a range of OBS values, each value indicating how far off the angle of arrival for any one of the communication sessions associated with the first cell is from the nominal boresight of the cell.

In some cases, the model manager 226 may train the machine learning model to generate the indication based on one or more identification techniques. For example, the model manager 226 may identify whether an indication of anomalousness matches a ground truth of the respective cell in the field (e.g., a set of generated communication parameters, distance values, or azimuth values). For instance, the model manager 226 can generate a feature vector containing a set of generated communication parameters, distance values, and/or azimuth values of data packets transmitted for different communication sessions established for different cells within the communications network. The model manager 226 can label the feature vector with ground truth values (e.g., correct predictions) for each cell indicating whether the cell is experiencing an anomaly. The model manager 226 can execute the machine learning model with the labeled feature vector and use a loss function and back-propagation techniques to train the machine learning model to accurately output predictions as to whether individual cells are anomalous or not. The model manager 226 can train the machine learning model until determining the machine learning model is accurate to a threshold. In some implementations, the model manager 226 may receive user input indicating whether an indication of anomalousness is accurate for a feature vector. Responsive to the input indication, the model manager 226 may tune various hyper parameters of the machine learning model. The model manager 226 may use any number of feature vectors to train the machine learning model.

The model manager 226 can train a single machine learning model to output indications of whether a cell is anomalous for multiple cells at a time or for one cell at a time. For example, the model manager 226 can train the machine learning model to receive data for communication sessions for multiple cells at once and output indications of whether each of the cells are anomalous in a single output. In another example, the model manager 226 can train the machine learning model to output an indication of whether a cell is anomalous for a single at a time and iteratively execute the machine learning model (the same machine learning model) using data for different cells for each execution. In another example, the model manager 226 can train different machine learning models for different cells. The model manager 226 can train the machine learning models to do so using communication data (e.g., labeled communication data) specific to the individual cells to which the machine learning models correspond. The model manager 226 can train the machine learning models to output predictions as to whether the cells are anomalous or not.

The classification generator 228 may comprise programmable instructions that, upon execution, cause the processor 218 to generate a classification for each cell. The classifications may classify each cell as either anomalous or non-anomalous. In some cases, the classifications may indicate a type of anomaly for the anomalous cells. For example, the classification generator 228 may determine that a first cell (e.g., the first cell 108-*a*) is experiencing an anomaly based on the output of the machine learning model. Responsive to or based on detecting the anomaly, the classification generator 228 may identify a displacement of a distribution of the OBS associated with the first cell (e.g., the center of a Gaussian distribution is above or below the center 104-*a*). Responsive to identifying the displacement, the classification generator 228 may determine that the cell is experiencing a first type of cell anomaly (e.g., cell drift). In some cases, types of anomalies may include a crossed feeder anomaly type, a cell drift (e.g., antenna drift) anomaly type, and/or other anomalies associated with a cell.

In some embodiments, the machine learning model may output an indication of the type of anomalies different cells are experiencing. For example, a machine learning model may be trained using back-propagation techniques (and/or other types of training techniques) to both identify anomalies in cells as well as the types of anomalies in the cells. In some implementations, the machine learning model may output the types of anomalies the different cells are experiencing in addition to the indications of the anomalies themselves for those cells the machine learning model determined to be anomalous.

The classification generator 228 can generate a list identifying the generated classifications for each cell. In some cases, the classification generator 228 may generate a list per service provider 208 that includes cells associated with the respective service provider 208. In some cases, the list may include an indication of the type of anomaly for each anomalous cell, a description of actions to resolve the anomaly (e.g., rewire the antennas, adjust the azimuth), or both.

The classification generator 228 may store the classification for each cell (e.g., an identification for each cell and the classification) in memory (e.g., the memory 220). In some embodiments, the classification generator 228 may store the classifications in the anomalous cells database 230. The anomalous cells database 230 may be a database (e.g., relational, non-relational, object oriented) that stores classifications generated by the classification generator 228, cell identifiers, types of anomalies, and/or identifiers for associated service providers 208, among other data. In some cases, the classification generator 228 may store such data from multiple communication sessions between different nodes with identifiers to distinguish between the communication sessions. In some examples, the classification generator 228 may store the data in memory instead of the anomalous cells database 230. The classification generator 228, the processor 218, and/or another component of the memory 220 may retrieve data from the anomalous cells database 230 to generate a list of classifications, to generate an anomalous cell alert, or both, among other uses.

The exporter 232 may comprise programmable instructions that, upon execution, cause the processor 218 to export (e.g., transmit) a record indicating that one or more cells are experiencing an anomaly, the list of classifications, the anomalous cell alert, or any combination thereof (e.g., generated data), to the network 205, a service provider 208, a server of the service provider 208, the computing device 202, or any combination thereof. For example, the exporter 232 may create an exportable file (e.g., a file with a format such as BIL, GRD/TAB, PNG, ASCII, KMZ, etc.) from the generated data and transmit the exportable file to the computing device 202 for display. The exporter 232 may transmit the exportable file to the computing device 202 responsive to a request from the computing device 202. In some embodiments, the exporter 232 may generate and/or export exportable files to the computing device 202 at set intervals to provide the computing device 202 with real-time updates of the performance of communication sessions between nodes.

Figure 3:
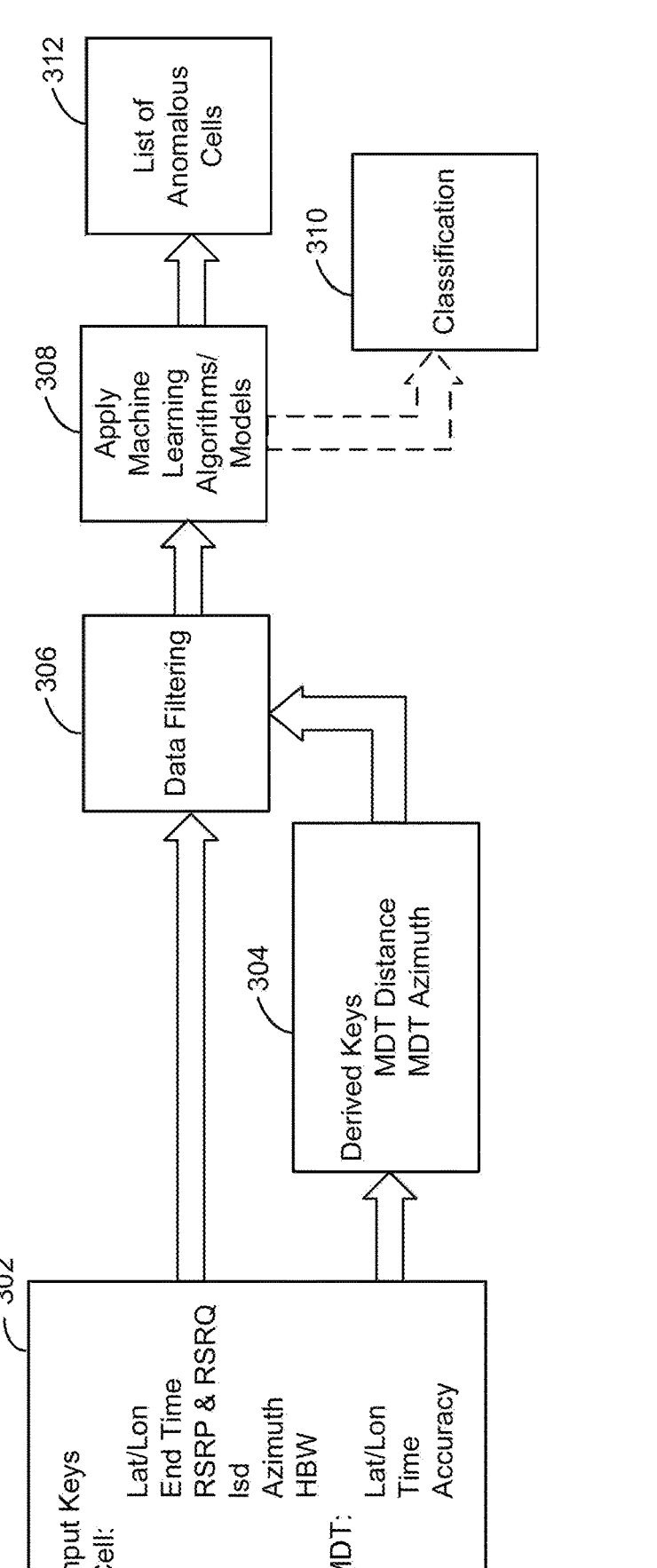
FIG. 3 is a flow diagram of a process for detecting cell positioning anomalies, in accordance with an implementation.

FIG. 3 illustrates a flow diagram of a process 300 for detecting cell positioning anomalies, in accordance with an implementation. The process 300 may be performed by a data processing system (e.g., a client device, a probe, the communication session analyzer 210, shown and described with reference to FIG. 2, a server system, etc.). The process 300 may include more or fewer operations and the operations may be performed in any order.

At operation 302, the data processing system may pull data from a database, a probe, and/or a network. A probe (e.g., probe 204) may collect control plane data packets or copies of control plane data packets transmitted between nodes (e.g., two nodes) of a communication session. A network (e.g., network 205) may store the control plane data packets of the communication session in memory (e.g., memory 220). The data may be for various communication parameters (e.g., configuration parameters) per cell and/or per communication session. In some cases, the data processing system may obtain portions of the communication parameters (e.g., network elements from CSPs) from a server of a service provider (e.g., service provider 208).

In some implementations, the various communication parameters may include one or more of the following parameters: latitude/longitude, end time, RSRP, RSRQ. ISD, azimuth, UE to cell site distance, HBW, time, and accuracy. In some cases, the parameters may be categorized by or be associated with either a cell or a node. For example, the parameters for a cell may include a latitude and a longitude of the cell (e.g., geo-location), an end time of the communication session, RSRP and RSRQ of the signaling associated with the communication session, the ISD of the cell (e.g., the average distance between cell sites, density of cells in an area), azimuth of the communication session from the cell, distance of the communication session UE to the cell, and the HBW of the cell antenna supporting the communication session. The parameters for a node (e.g., an MDT data report) may include a latitude and a longitude and an altitude of the device, an accuracy of the latitude and longitude (e.g., potential uncertainty of the geo-location of the device, which may be higher indoors than outdoors), and a time of the data (e.g., a time of the MDT data report).

At operation 304, the data processing system may calculate (e.g., derive) one or more distance values (e.g., an MDT distance value) and one or more azimuth values (e.g., an MDT azimuth value) for each cell. For example, the data processing system may derive a distance value and an azimuth value for each communication session of a cell. To do so, the data processing system may use the geo-location of the cell, the geo-location of the node, and the azimuth from the cell to calculate the angle of the location of the node in relation to the cell and the distance between the node and the cell. In some cases, the data processing system may derive the distance value and the azimuth value for each MDT data report. For instance, a communication session may last for a long duration (e.g., if a communication session is a video it may last for a few minutes to hours) and the data processing system may collect multiple parameters (e.g., a set of parameters per MDT data report) associated with different times (e.g., reported periodically, reported pseudo-randomly) for a single communication session.

At operation 306, the data processing system may filter the multiple sets of parameters. The filtering may include determining if the sets of parameters (e.g., the communication parameters, the distance values, and the azimuth values) of a cell satisfy one or more thresholds. For instance, the thresholds may include a threshold for each parameter or a threshold for a portion of parameters of a set of parameters. A first threshold may be based on an accuracy value. For example, the data processing system may filter out accuracy values that have an uncertainty above the first threshold (e.g., uncertainty above 100 meters). A second threshold may be based on a time value. For example, the data processing system may filter out time values that are before the most recent time value (e.g., filter out values with a time difference greater than one second from the end time). A third threshold may be based on a power value. For example, the data processing system may filter out RSRP and/or RSRQ values that are below a threshold associated with signal strength at the boresight (e.g., RSRP<–80, RSRQ<–10). A fourth threshold may be based on an ISD value. A fifth threshold may be based on the UE to cell site distance value. For example, the data processing system may filter out distance values that are outside of one times the ISD (e.g., to avoid calls close to handover). It is to be understood that the indicated thresholds are provided as examples and multiple other thresholds may be used for the filtering process.

At operation 308, the data processing system may execute a machine learning model using the filtered data as inputs. In some implementations, the filtered data may be input as a distribution (e.g., a histogram of the offset of communication sessions from the nominal boresight direction). The filtered data may include data from one communication session or data from multiple communication sessions. The data processing system can execute the machine learning model using communication parameters and derived data from the communication parameters (e.g., the same communication parameters) as input. In some examples, a cell may experience an anomaly. For instance, a cell tilt or azimuth may change over time due to various causes (e.g., events such as natural disasters, mechanical failures, human errors etc.). This may be considered a cell or antenna drift anomaly. Another example may include a crossed feeder anomaly, where the wires configured for a first cell may be crossed with the wires configured for a second cell. The different anomalies may be considered types of anomalies. Responsive to inputting the filtered data into the machine learning model, the machine learning model may output an indication of whether the cell is experiencing an anomaly. In some implementations, the machine learning model may output an associated type of anomaly with each indication.

At operation 310, the data processing system may classify each cell. In some cases, each classification may include an identification of the cell, the indication of anomalousness, the type of anomaly, or any combination thereof. For example, responsive to identifying a cell is anomalous based on the output of the machine learning model, the data processing system may determine the type of anomaly. The data processing system may identify aspects of the distribution deviate from an optimal distribution (e.g., a distribution associated with a network element table of the CSPs).

The data processing system may classify the anomaly to be a first type of anomaly based on the identified deviations (e.g., excess at high angular displacements may indicate a crossed feeder anomaly).

At operation 312, the data processing system may generate one or more lists of classifications. Each list may be associated with a service provider (e.g., a network provider). For example, the data processing system may identify a set of cells associated with a first service provider (e.g., service provider 208*a*). The data processing system may generate a list of classifications including classifications for each cell of the set of cells associated with the first service provider. The data processing system may transmit the list to the first service provider. In some embodiments, the data processing system may generate a record (e.g., a notification) indicating that a first cell is experiencing a first type of anomaly based on a list of classifications. The data processing system may identify a server of a service provider associated with the first cell. The data processing system may transmit the record to the server.

Figure 4:
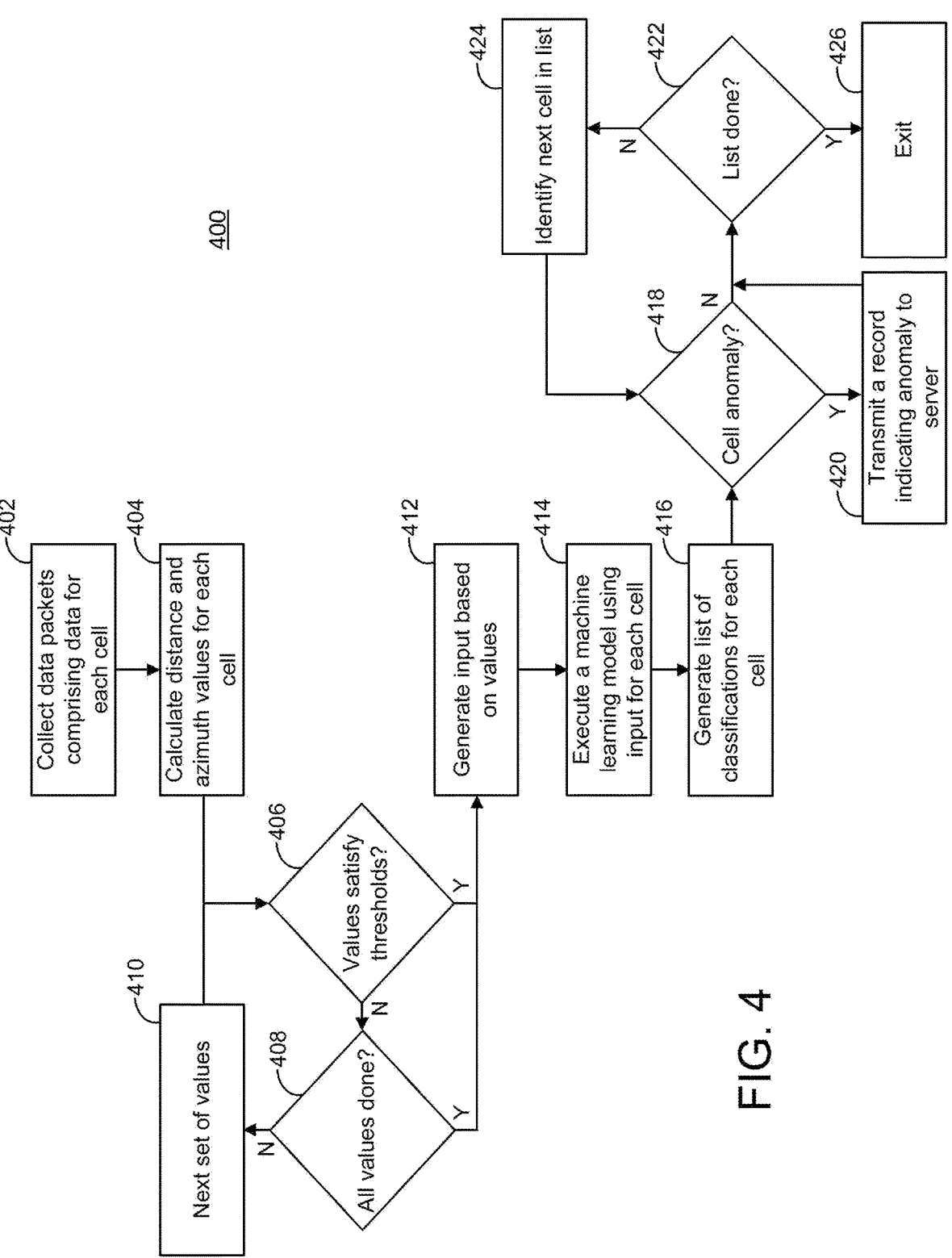
FIG. 4 is a method for detecting cell positioning anomalies, in accordance with an implementation.

FIG. 4 illustrates a method 400 for detecting cell positioning anomalies, in accordance with an implementation. The method 400 may be performed by a data processing system (a client device, a probe, the communication analyzer 210, shown and described with reference to FIG. 2, a server system, etc.). The method 400 may include more or fewer operations and the operations may be performed in any order. Cells within a communication network may experience various anomalies that may be caused by various human, environmental, or other events. These anomalies may result in a high resource costs, reduced user experience, and inefficient systems. Performance of the method 400 may enable the data processing system to use a machine learning model to detect anomalous cells and notify a service provider of the anomalies. To provide detection and notification services, the data processing system may obtain and/or calculate various communication parameters. The data processing system may filter the parameters and use the filtered parameters as input to a machine learning model. The data processing system may train the machine learning model based on one or more identification techniques.

At operation 402, the data processing system may collect multiple control plane signaling data packets. The data packets may include data for various communication parameters for each cell of a communications network. The data processing system may receive the data from memory, a probe, a network, or other component (e.g., memory 120, probe 104, network 105). For instance, the data processing system may collect the data packets from a probe associated with multiple communication channels of the communications network. The data may be for multiple sets of communication parameters for each cell, where each set of parameters is associated with a communication session and a cell.

At operation 404, the data processing system may calculate a distance value and an azimuth value for each set of parameters. The data processing system may calculate the distance value and the azimuth value based on geo-location parameters (e.g., azimuth of the cell, latitude and longitude of the cell, etc.) of the set of parameters. The distance value may indicate a distance between the cell and a first node associated with the communication session. The azimuth value may indicate an angle of a physical location of the first node in relation to the cell.

At operation 406, the data processing system may determine if the data satisfies one or more thresholds. The data processing system may filter the data for the sets of communication parameters, the azimuth values, the distance values, or any combination thereof, to generate input for a machine learning model. In a first example, the data processing system may filter the data, the azimuth values, and the distance values. In a second example, the data processing system may filter the data prior to calculating the azimuth values and the distance values. The data processing system may filter the data by comparing one or more of the parameters of the set of parameters to one or more thresholds. Each threshold may be associated with a parameter of the set of parameters. For example, the thresholds may be associated with an accuracy value, a time value, a power value, an ISD value, a UE to cell site distance value, an HBW value, or any combination thereof, among other parameters, as described herein with reference to FIGS. 2 and 3. If the parameter satisfies the threshold, then the data processing system may continue to operation 412. If the parameter does not satisfy the threshold, then the data processing system may continue to operation 408.

At operation 408, the data processing system may determine if each set of parameters for the first cell has been processed. If a distance value and an azimuth value has been calculated for each set of parameters, then the data processing system may continue to operation 412. If the parameter does not satisfy the threshold, then the data processing system may continue to operation 410. At operation 410, the data processing system may process a next set of parameters and calculate a distance value and an azimuth value for the next set of parameters.

At operation 412, the data processing system may generate input based on the distance values for each cell, the azimuth values for each cell, at least a portion of parameters of the sets of parameters for each cell, or any combination thereof. For example, respective to filtering the distance values, the azimuth values, and/or the sets of parameters, for each cell, the data processing system may input the filtered data into the machine learning model.

At operation 414, the data processing system may execute a machine learning model for each cell using the input associated with each cell. In some cases, the input may be the filtered data configured in one or more types of distributions (e.g., a distribution of OBS). The machine learning model may output an indication of anomalousness per cell, a type of anomaly associated with an anomalous cell, or both. In some cases, an anomaly may be associated with one or more types of anomalies, including a crossed feeder anomaly and/or an antenna drift anomaly. In some implementations, the data processing system may train the machine learning model to generate the indication for each cell based on one or more of a user input, a set of generated communication parameters, distance values, and/or azimuth values. For instance, the data processing system may generate one or more feature vectors including the set of generated communication parameters, distance values, and/or azimuth values. In one example, the data processing system can train the machine learning model based on data sets of distributions of MDT data from individual cells. The data processing system may label the feature vector with ground truth values (e.g., correct predictions) for each cell, indicating whether the cell is anomalous. The data processing system may execute the machine learning model using the labeled feature vector and use various training techniques (e.g., loss function, back-propagation) to train the machine learning model to make accurate predictions of anomalousness. In some cases, the data processing system may tune various hyper parameters of the machine learning model based on received user input.

At operation 416, the data processing system may generate a list of classifications. For example, at operation 418, the data processing system may determine whether a first cell is experiencing an anomaly based on the output of the machine learning model. The data processing system may generate a classification for the first cell, where the classification may include an identification for the cell, an identification of a network provider associated with the cell, the indication of anomalousness from the machine learning model, a type of anomaly if anomalous, and/or one or more actions to fix the anomalous behavior. The data processing system may store the classification in memory. If the data processing system determines that the first cell is experiencing an anomaly, the data processing system may continue to operation 420. If the data processing system determines that the first cell is non-anomalous, then the data processing system may continue to operation 422.

At operation 420, the data processing system may transmit, to a server of a network provider, a record indicating the anomaly and the cell. In some cases, the record may include the classification, including an indication of actions to take to correct the anomaly. The indication of actions may be based on the type of anomaly. The data processing system may identify the server of the network provider associated with the first cell based on data from one or more tables in a database.

At operation 422, the data processing system may determine whether each cell has been classified. If each cell has received (e.g., been given) a classification indicating whether the cell is anomalous, then the data processing system may continue to operation 426. If each cell has not received a classification, then the data processing system may continue to operation 424. At operation 424, the data processing system may identify an unclassified cell. The data processing system may continue to operation 418 to determine whether the cell is experiencing an anomaly and to generate a classification for the cell. Responsive to generating a classification for each cell, the data processing system may generate a list identifying the generated classifications for the cells. In some implementations, the data processing system may generate a list for each network provider (e.g., service provider), a list including classifications for each of the cells regardless of association to service providers, or both. In some cases, the data processing system may transmit the list to a server of the appropriate service provider. At operation 426, the data processing system may exit the cell anomaly detecting process.

Figure 5A:
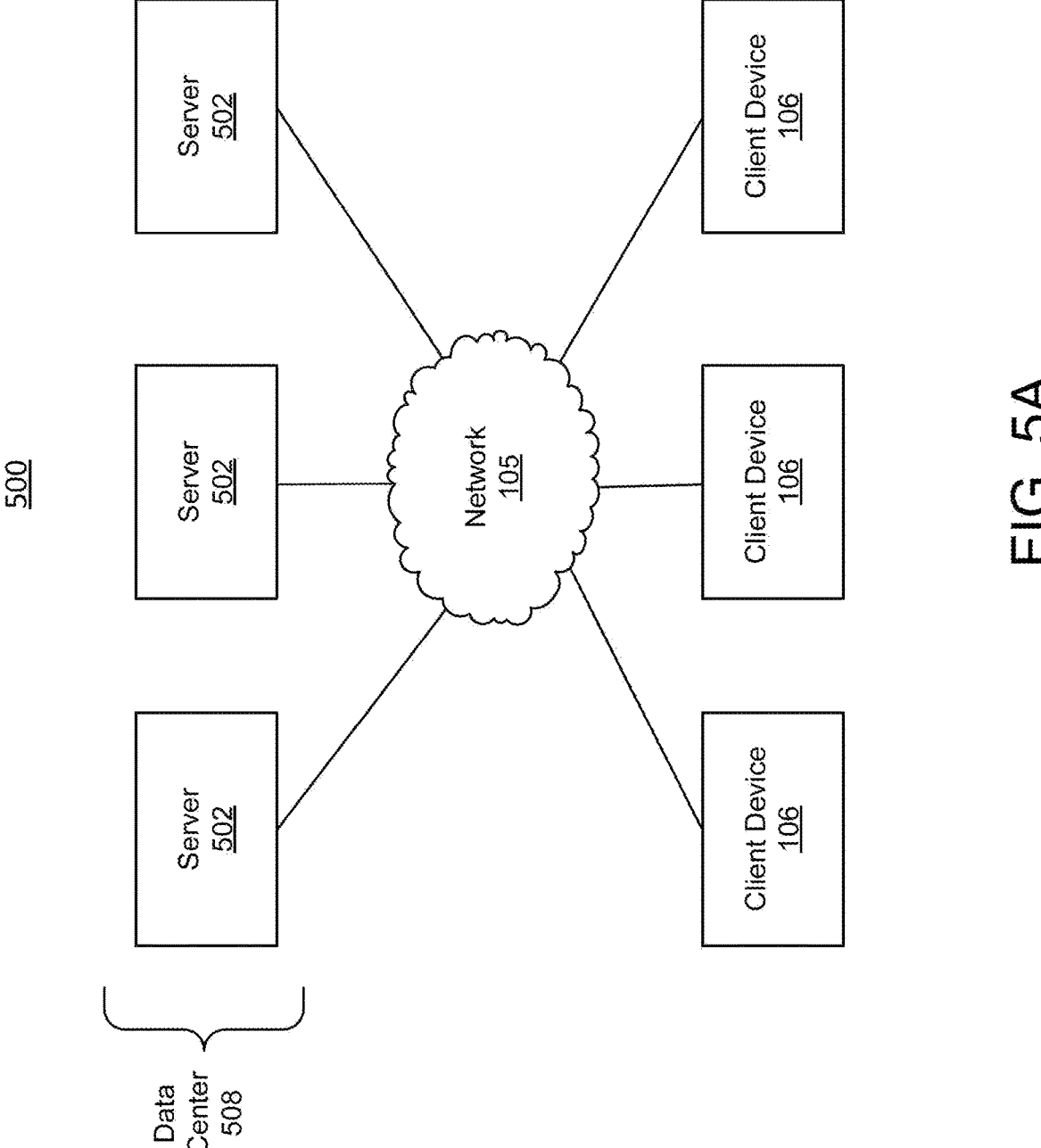
FIG. 5A is a block diagram depicting an implementation of a network environment including a client device in communication with a server device.

FIG. 5A depicts an example network environment that can be used in connection with the methods and systems described herein. In brief overview, the network environment 500 includes one or more client devices 206 (also generally referred to as clients, client node, client machines, client computers, client computing devices, endpoints, or endpoint nodes) in communication with one or more servers 502 (also generally referred to as servers, nodes, or remote machine) via one or more networks 205. In some embodiments, a client 206 has the capacity to function as both a client node seeking access to resources provided by a server and as a server providing access to hosted resources for other client devices 206.

Although FIG. 5A shows a network 105 between the client devices 106 and the servers 502, the client devices 106 and the servers 502 can be on the same network 105. In embodiments, there are multiple networks 105 between the client devices 106 and the servers 502. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g. FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g. Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 500 can include multiple, logically grouped servers 502. The logical group of servers can be referred to as a data center 508 (or server farm or machine farm). In embodiments, the servers 502 can be geographically dispersed. The data center 508 can be administered as a single entity or different entities. The data center 508 can include multiple data centers 508 that can be geographically dispersed. The servers 502 within each data center 508 can be homogeneous or heterogeneous (e.g., one or more of the servers 502 or machines 502 can operate according to one type of operating system platform (e.g., WINDOWS 10 manufactured by Microsoft Corp. of Redmond, Washington), while one or more of the other servers 502 can operate on according to another type of operating system platform (e.g., Unix, Linux, or Mac OS X)). The servers 502 of each data center 508 do not need to be physically proximate to another server 502 in the same machine farm 508. Thus, the group of servers 502 logically grouped as a data center 508 can be interconnected using a network. Management of the data center 508 can be de-centralized. For example, one or more servers 502 can comprise components, subsystems and modules to support one or more management services for the data center 508.

Server 502 can be a file server, application server, web server, proxy server, appliance, network appliance, gateway, gateway server, virtualization server, deployment server, SSL VPN server, or firewall. In embodiments, the server 502 can be referred to as a remote machine or a node. Multiple nodes can be in the path between any two communicating servers.

Figure 5B:
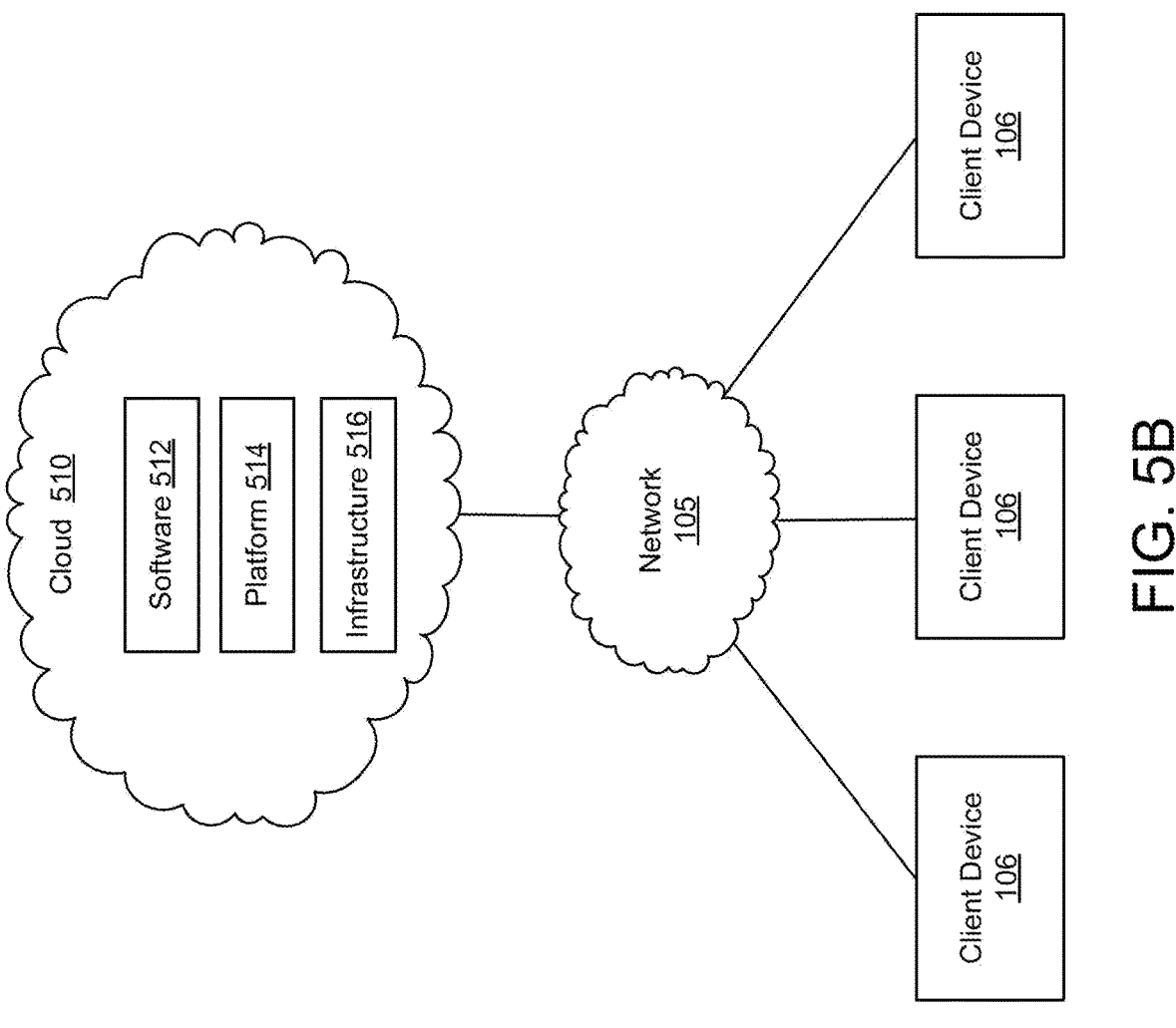
FIG. 5B is a block diagram depicting a cloud computing environment including a client device in communication with cloud service providers.

FIG. 5B illustrates an example cloud computing environment. A cloud computing environment 501 can provide client 204 with one or more resources provided by a network environment. The cloud computing environment 501 can include one or more client devices 106, in communication with the cloud 510 over one or more networks 105. Client devices 106 can include, e.g., thick clients, thin clients, and zero clients. A thick client can provide at least some functionality even when disconnected from the cloud 510 or servers 502. A thin client or a zero client can depend on the connection to the cloud 510 or server 502 to provide functionality. A zero client can depend on the cloud 510 or other networks 105 or servers 502 to retrieve operating system data for the client device. The cloud 510 can include back end platforms, e.g., servers 502, storage, server farms or data centers.

The cloud 510 can be public, private, or hybrid. Public clouds can include public servers 502 that are maintained by third parties to the client devices 106 or the owners of the clients. The servers 502 can be located off-site in remote geographical locations as disclosed above or otherwise. Public clouds can be connected to the servers 502 over a public network. Private clouds can include private servers 502 that are physically maintained by client devices 106 or owners of clients. Private clouds can be connected to the servers 502 over a private network 105. Hybrid clouds 508 can include both the private and public networks 105 and servers 502.

The cloud 510 can also include a cloud-based delivery, e.g. Software as a Service (Saas) 512, Platform as a Service (PaaS) 514, and the Infrastructure as a Service (IaaS) 516. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 106 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client 106 and server 502 can be deployed as and/or executed on any type and form of computing device, e.g. a computer, network device or appliance capable of communicating on any type and form of network and performing the operations described herein.

Figure 5C:
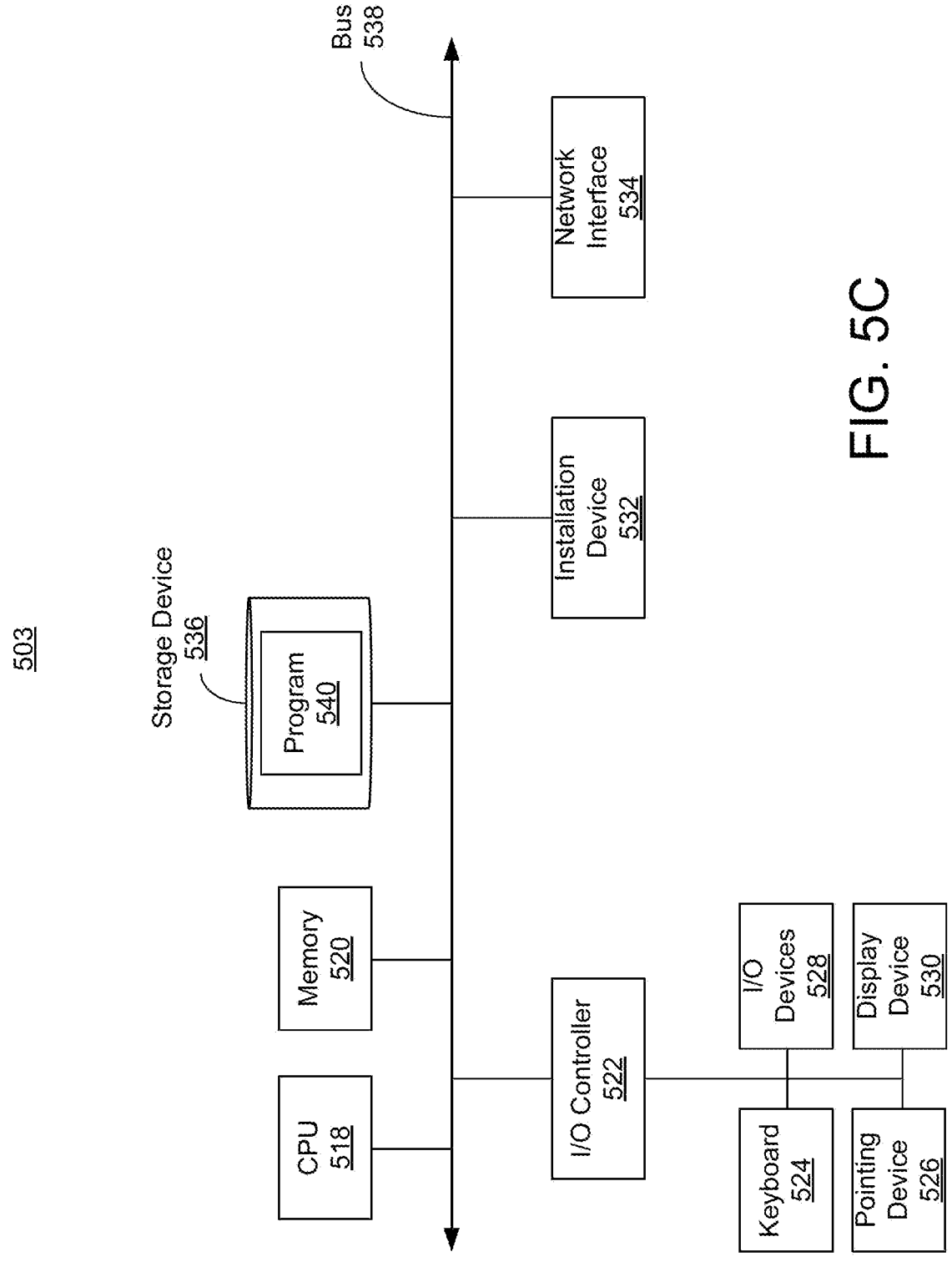
FIG. 5C is a block diagram depicting an implementation of a computing device that can be used in connection with the systems depicted in FIGS. 1, 2, 5A and 5B, and the method depicted in FIG. 4.

FIG. 5C depicts block diagrams of a computing device 503 useful for practicing an embodiment of the client 106 or a server 502. As shown in FIG. 5C, each computing device 503 can include a central processing unit 518, and a main memory unit 520. As shown in FIG. 5C, a computing device 503 can include one or more of a storage device 536, an installation device 532, a network interface 534, an I/O controller 522, a display device 530, a keyboard 524 or a pointing device 526, e.g. a mouse. The storage device 536 can include, without limitation, a program 540, such as an operating system, software, or software associated with system 200.

The central processing unit 518 is any logic circuitry that responds to and processes instructions fetched from the main memory unit 520. The central processing unit 518 can be provided by a microprocessor unit, e.g.: those manufactured by Intel Corporation of Mountain View, California. The computing device 503 can be based on any of these processors, or any other processor capable of operating as described herein. The central processing unit 518 can utilize instruction level parallelism, thread level parallelism, different levels of cache, and multi-core processors. A multi-core processor can include two or more processing units on a single computing component.

Main memory unit 520 can include one or more memory chips capable of storing data and allowing any storage location to be directly accessed by the microprocessor 518. Main memory unit 520 can be volatile and faster than storage 536 memory. Main memory units 520 can be Dynamic random access memory (DRAM) or any variants, including static random access memory (SRAM). The memory 520 or the storage 536 can be non-volatile; e.g., non-volatile read access memory (NVRAM). The memory 520 can be based on any type of memory chip, or any other available memory chips. In the example depicted in FIG. 5C, the processor 518 can communicate with memory 520 via a system bus 538.

A wide variety of I/O devices 528 can be present in the computing device 503. Input devices 528 can include keyboards, mice, trackpads, trackballs, touchpads, touch mice, multi-touch touchpads and touch mice, microphones, multiarray microphones, drawing tablets, cameras, or other sensors. Output devices can include video displays, graphical displays, speakers, headphones, or printers.

I/O devices 528 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 528, display devices 530 or group of devices can be augmented reality devices. The I/O devices can be controlled by an I/O controller 522 as shown in FIG. 5C. The I/O controller 522 can control one or more I/O devices, such as, e.g., a keyboard 524 and a pointing device 526, e.g., a mouse or optical pen. Furthermore, an I/O device can also provide storage and/or an installation device 532 for the computing device 503. In embodiments, the computing device 503 can provide USB connections (not shown) to receive handheld USB storage devices. In embodiments, an I/O device 528 can be a bridge between the system bus 538 and an external communication bus, e.g. a USB bus, a SCSI bus, a FireWire bus, an Ethernet bus, a Gigabit Ethernet bus, a Fibre Channel bus, or a Thunderbolt bus.

In embodiments, display devices 530 can be connected to I/O controller 522. Display devices can include, e.g., liquid crystal displays (LCD), electronic papers (e-ink) displays, flexile displays, light emitting diode displays (LED), or other types of displays. In some embodiments, display devices 530 or the corresponding I/O controllers 522 can be controlled through or have hardware support for OPENGL or DIRECTX API or other graphics libraries. Any of the I/O devices 528 and/or the I/O controller 522 can include any type and/or form of suitable hardware, software, or combination of hardware and software to support, enable or provide for the connection and use of one or more display devices 530 by the computing device 503. For example, the computing device 503 can include any type and/or form of video adapter, video card, driver, and/or library to interface, communicate, connect or otherwise use the display devices 530. In embodiments, a video adapter can include multiple connectors to interface to multiple display devices 530.

The computing device 503 can include a storage device 536 (e.g., one or more hard disk drives or redundant arrays of independent disks) for storing an operating system or other related software, and for storing application software programs 540 such as any program related to the systems, methods, components, modules, elements, or functions depicted in FIG. 1, 2, or 3. Examples of storage device 536 include, e.g., hard disk drive (HDD); optical drive including CD drive, DVD drive, or BLU-RAY drive; solid-state drive (SSD); USB flash drive; or any other device suitable for storing data. Storage devices 536 can include multiple volatile and non-volatile memories, including, e.g., solid state hybrid drives that combine hard disks with solid state cache. Storage devices 536 can be non-volatile, mutable, or read-only. Storage devices 536 can be internal and connect to the computing device 503 via a bus 538. Storage device 536 can be external and connect to the computing device 503 via an I/O device 530 that provides an external bus. Storage device 536 can connect to the computing device 503 via the network interface 534 over a network 105. Some client devices 106 may not require a non-volatile storage device 536 and can be thin clients or zero client devices 106. Some storage devices 536 can be used as an installation device 532 and can be suitable for installing software and programs.

The computing device 503 can include a network interface 534 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 503 can communicate with other computing devices 503 via any type and/or form of gateway or tunneling protocol e.g., Secure Socket Layer (SSL) or Transport Layer Security (TLS), QUIC protocol, or the Citrix Gateway Protocol manufactured by Citrix Systems, Inc. of Ft. Lauderdale, Florida. The network interface 534 can include a built-in network adapter, network interface card, PCMCIA network card, EXPRESSCARD network card, card bus network adapter, wireless network adapter, USB network adapter, modem or any other device suitable for interfacing the computing device 503 to any type of network capable of communication and performing the operations described herein.

A computing device 503 of the sort depicted in FIG. 5C can operate under the control of an operating system, which controls scheduling of tasks and access to system resources. The computing device 503 can be running any operating system configured for any type of computing device, including, for example, a desktop operating system, a mobile device operating system, a tablet operating system, or a smartphone operating system.

The computing device 503 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 503 has sufficient processor power and memory capacity to perform the operations described herein. In some embodiments, the computing device 503 can have different processors, operating systems, and input devices consistent with the device.

In embodiments, the status of one or more machines 106, 502 in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 503 in response to the CPU 518 executing an arrangement of instructions contained in main memory 520. Such instructions can be read into main memory 520 from another computer-readable medium, such as the storage device 536. Execution of the arrangement of instructions contained in main memory 520 causes the computing device 503 to perform the illustrative processes described herein. One or more processors in a multi-processing arrangement may also be employed to execute the instructions contained in main memory 520. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

The description relates to a network monitoring system that may implement a cell anomaly detection method. For example, CSPs may report configuration parameters that may be incorrect due to, for instance, human error and/or natural causes (e.g., cell drift, crossed feeder, etc.). Some CSPs and other entities within a wireless communication system may have difficulties detecting these errors. For example, they may not have the ability to detect the anomalies, may detect the anomalies only after manually checking the towers and antennas of each cell, among other problems.

A computer implementing the systems and methods described herein may overcome the aforementioned technical deficiencies. For example, the computer implementing the techniques described herein may provide an automated system for detecting cell anomalies for large (e.g., unlimited based on computational power) quantities of cells. The techniques may include the computer operating to execute a machine learning model to detect cell anomalies. To do so, the computer may operate to calculate a distance value and an azimuth value for each cell to input to the machine learning model, among various other data. The computer may operate to generate one or more lists of classifications per cell indicating whether each cell is experiencing an anomaly based on the output from the machine learning model.

At least one aspect of a technical solution to the aforementioned problem is directed to a method. The method may comprise collecting, by a processor via a probe associated with a plurality of communication channels of a communications network, a plurality of control plane signaling data packets comprising data for a plurality of communication parameters for each cell of a plurality of cells of the communications network; calculating, by the processor, distance values and azimuth values for individual communication sessions of each cell based on the data for the plurality of communication parameters for the cell; executing, by the processor using at least a portion of the data for the plurality of communication parameters for each cell, the distance values for each cell, the azimuth values for each cell, or any combination thereof, as input, a machine learning model to generate a classification for each cell, the classification indicating whether the cell is experiencing an anomaly; and generating, by the processor, a list identifying the generated classifications for the plurality of cells.

At least one aspect of this technical solution is directed to a system. The system may comprise a processor. The processor may collect, by a processor via a probe associated with a plurality of communication channels of a communications network, a plurality of control plane signaling data packets comprising data for a plurality of communication parameters for each cell of a plurality of cells of the communications network; calculate, by the processor, distance values and azimuth values for individual communication sessions of each cell based on the data for the plurality of communication parameters for the cell; execute, by the processor using at least a portion of the data for the plurality of communication parameters for each cell, the distance values for each cell, the azimuth values for each cell, or any combination thereof, as input, a machine learning model to generate a classification for each cell, the classification indicating whether the cell is experiencing an anomaly; and generate, by the processor, a list identifying the generated classifications for the plurality of cells.

At least one aspect of this technical solution is directed to a non-transitory computer-readable storage medium storing executable instructions that, when executed by a processor, cause the processor to collect, by a processor via a probe associated with a plurality of communication channels of a communications network, a plurality of control plane signaling data packets comprising data for a plurality of communication parameters for each cell of a plurality of cells of the communications network; calculate, by the processor, distance values and azimuth values for individual communication sessions of each cell based on the data for the plurality of communication parameters for the cell; execute, by the processor using at least a portion of the data for the plurality of communication parameters for each cell, the distance values for each cell, the azimuth values for each cell, or any combination thereof, as input, a machine learning model to generate a classification for each cell, the classification indicating whether the cell is experiencing an anomaly; and generate, by the processor, a list identifying the generated classifications for the plurality of cells.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the probe 204 or the communication session analyzer 210) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method comprising:

collecting, by a processor via a probe associated with a plurality of communication channels of a communications network, a plurality of control plane signaling data packets comprising data for a plurality of communication parameters for each cell of a plurality of cells of the communications network;

calculating, by the processor, distance values and azimuth values for individual communication sessions of each cell based on the data for the plurality of communication parameters for the cell;

executing, by the processor using at least a portion of the data for the plurality of communication parameters for each cell, the distance values for each cell, the azimuth values for each cell, as input, a machine learning model to generate a classification for each cell, the classification indicating whether the cell is experiencing an anomaly; and generating, by the processor, a list identifying the generated classifications for the plurality of cells.

2. The method of claim 1, further comprising:

filtering, by the processor, the data for the plurality of communication parameters, the distance values, or the azimuth values, to generate the input based on satisfying one or more thresholds.

3. The method of claim 1, further comprising:

identifying, by the processor, that a first cell of the plurality of cells is experiencing a first type of anomaly based on the list;

identifying, by the processor, a server of a network provider associated with the first cell; and transmitting, to the server by the processor, a record indicating that the first cell is experiencing the first type of anomaly.

4. The method of claim 1, further comprising:

training, by the processor, the machine learning model to generate the classification for each cell based on one or more of a set of generated communication parameters, distance values, or azimuth values.

5. The method of claim 1, wherein the data for the plurality of communication parameters for a first cell of the plurality of cells at least comprises data associated with a first communication session of a first node of the communications network.

6. The method of claim 1, wherein a distance value indicates a distance between a first cell of the plurality of cells and a first node of the communications network.

7. The method of claim 1, wherein an azimuth value indicates an angle of a physical location of a first node of the communications network in relation to a first cell of the plurality of cells.

8. The method of claim 1, wherein the anomaly is associated with one or more types of anomalies comprising a crossed feeder anomaly type or an antenna drift anomaly type.

9. A system, comprising:

a processor, coupled to memory, to:

collect, by the processor via a probe associated with a plurality of communication channels of a communications network, a plurality of control plane signaling data packets comprising data for a plurality of communication parameters for each cell of a plurality of cells of the communications network;

calculate, by the processor, distance values and azimuth values for individual communication sessions of each cell based on the data for the plurality of communication parameters for the cell;

execute, by the processor using at least a portion of the data for the plurality of communication parameters for each cell, the distance values for each cell, or the azimuth values for each cell, as input, a machine learning model to generate a classification for each cell, the classification indicating whether the cell is experiencing an anomaly; and generate, by the processor, a list identifying the generated classifications for the plurality of cells.

10. The system of claim 9, wherein the processor further:

filter the data for the plurality of communication parameters, the distance values, or the azimuth values, to generate the input based on satisfying one or more thresholds.

11. The system of claim 9, wherein the processor further:

identify that a first cell of the plurality of cells is experiencing a first type of anomaly based on the list;

identify a server of a network provider associated with the first cell; and transmit, to the server, a record indicating that the first cell is experiencing the first type of anomaly.

12. The system of claim 9, wherein the processor further:

train the machine learning model to generate the classification for each cell based on one or more of a set of generated communication parameters, distance values, or azimuth values.

13. The system of claim 9, wherein the data for the plurality of communication parameters for a first cell of the plurality of cells at least comprises data associated with a first communication session of a first node of the communications network.

14. The system of claim 9, wherein the distance values indicates a distance between a first cell of the plurality of cells and a first node of the communications network.

15. The system of claim 9, wherein the azimuth values indicates an angle of a physical location of a first node of the communications network in relation to a first cell of the plurality of cells.

16. The system of claim 9, wherein the anomaly is associated with one or more types of anomalies comprising a crossed feeder anomaly type or an antenna drift anomaly type.

17. A non-transitory computer readable storage medium comprising instructions stored thereon that, when executed by a processor, cause the processor to:

collect, by the processor via a probe associated with a plurality of communication channels of a communications network, a plurality of control plane signaling data packets comprising data for a plurality of communication parameters for each cell of a plurality of cells of the communications network;

calculate, by the processor, distance values and azimuth values for individual communication sessions for each cell based on the data for the plurality of communication parameters for the cell;

execute, by the processor using at least a portion of the data for the plurality of communication parameters for each cell, the distance values for each cell, the azimuth values for each cell, or any combination thereof, as input, a machine learning model to generate a classification for each cell, the classification indicating whether the cell is experiencing an anomaly; and generate, by the processor, a list identifying the generated classifications for the plurality of cells.

18. The medium of claim 17, comprising instructions stored thereon that, when executed by the processor, cause the processor to:

filter the data for the plurality of communication parameters, the distance values, the azimuth values, or any combination thereof, to generate the input based on satisfying one or more thresholds.

19. The medium of claim 17, comprising instructions stored thereon that, when executed by the processor, cause the processor to:

identify that a first cell of the plurality of cells is experiencing a first type of anomaly based on the list;

identify a server of a network provider associated with the first cell; and transmit, to the server via the probe, a record indicating that the first cell is experiencing the first type of anomaly.

20. The medium of claim 17, comprising instructions stored thereon that, when executed by the processor, cause the processor to:

train the machine learning model to generate the classification for each cell based on one or more of a set of generated communication parameters, distance values, or azimuth values.

21. The method of claim 1, wherein the probe collects control plane signaling data at an Evolved Packet Core interface of the communications network.

22. The system of claim 9, wherein the probe collects control plane signaling data at an Evolved Packet Core interface of the communications network.

23. The medium of claim 17, wherein the probe collects control plane signaling data at an Evolved Packet Core interface of the communications network.

\* \* \* \* \*